UNITED STATES PATENT OFFICE.

JOHN W. FRIES, OF SALEM, NORTH CAROLINA.

TANNING PROCESS.

SPECIFICATION forming part of Letters Patent No. 343,166, dated June 8, 1886.

Application filed May 11, 1885. Serial No. 165,106. (No specimens.)

*To all whom it may concern:*

Be it known that I, JOHN W. FRIES, of Salem, in the county of Forsyth and State of North Carolina, have invented certain new and useful Improvements in Tanning Processes, of which the following is a specification.

My invention consists in a novel method or process of tanning, hereinafter more fully set forth, the invention relating to those operations performed subsequent to the liming and unhairing of the hides.

It has long been known that copperas (sulphate of iron) would tan hides; but the quality of leather produced by its use has not been such as to cause its general adoption.

My invention is designed to secure a better quality of leather than has hitherto been possible through the use of copperas, and with this object in view I proceed as follows:

The hides previously limed and unhaired in the ordinary way for tanning with oak-bark, or by sweating, or by the aid of sulphide of sodium, or other process, are placed in a bath of carbonate of iron, where they should be suspended, as in a "rocker-handler," for two days, more or less, and agitated from time to time. For this bath I employ carbonate of protoxide of iron dissolved in water, and it is not material from what source or agents this is obtained; nor is it important to observe closely any stated quantity of the chemicals used to a given quantity of water. The water, even when saturated with carbonic acid, will dissolve but a limited quantity of the carbonate; but for this same reason there should always be an ample supply of undissolved carbonate of iron precipitate in the liquor. If well-water is used, which contains usually a considerable amount of carbonic acid in solution naturally, a good working proportion of chemicals would be: copperas, three pounds per cubic foot of water, and sal-soda, three pounds per cubic foot of water. To this a small quantity of sulphuric acid may be advantageously added, so as to saturate the water with carbonic acid. If the water used contains but little free carbonic acid, I prefer a bath containing copperas, three pounds per cubic foot of water, and bicarbonate of soda, two pounds per cubic foot of water. To this liquid may be added sugar in the proportion of, say, one-half pound of sugar to each pound of copperas, for the purpose of preventing the protoxide of iron from passing into the sesquioxide; but the use of saccharine matter is not essential to the process.

Hydrochloric acid may be used to dissolve the carbonate of iron; but I prefer the carbonic acid as being safer and less expensive.

In the continued use of the same vat, with additions of copperas and soda from time to time, the liquor soon becomes supersaturated with sulphate of soda, and it therefore becomes desirable to allow the liquor to settle from time to time, and to draw off the clear portion which contains the sulphate of soda in solution, saving the carbonate-of-iron precipitate at the bottom of the vat, and filling up with clear water. The liquor should be kept constantly saturated with carbonic acid. After the hides have been fully acted on by this carbonate solution, which requires only two or three days, I transfer them to another liquor consisting of copperas and common salt dissolved in water. It is not material that these salts be in very exact and definite proportions to each other, or to the quantity of water in which they are dissolved; but in practice no disadvantage is found in employing a strong solution, and as there is no waste or deterioration I find it advisable to make the solution strong, to insure sufficient action. I have, therefore, used in practice copperas, twenty-five to forty pounds per cubic foot of water, and common salt, fifteen to twenty-five pounds per cubic foot of water. In this as in the first liquor it is desirable to have the hides suspended, as in a rocker-handler, and agitated from time to time, so that the liquor shall have free access to and come into contact with all parts of the hide. Two or three days in this liquor are sufficient to complete the tanning. When taken from this liquor, the hides do not have the appearance of leather tanned by ordinary processes; but on being hung up to dry the iron throughout the body of the hide becomes thoroughly oxidized, and the leather becomes firm, fibrous, and of a yellowish-brown color.

The currying of this leather may be similar to that of bark-tanned leather in a general way, but must be varied somewhat as to details. Thus I find that ordinary tanner's fish-oil is not readily absorbed by leather tanned as above, but tends to make it hard and dark, and glazes its surface, giving the appearance of a coating of varnish. Beef-tallow with paraffine-oil, on the contrary, answers well, and hog's lard and cotton-seed oil also give good results. Many other oils and fats may hereafter be found as well or better suited to this stage of the process; but up to the present time cotton-seed oil is deemed the best for general use in this connection.

Any oil or fat which will readily enter the pores of the leather and render it soft and pliable may be used.

So far as I am aware, the use of carbonate of iron for tanning has never before been proposed, and is believed by me to be broadly new, and therefore I do not restrict myself to the proportions stated, nor to the precise order set forth.

Having thus described my invention, what I claim is—

1. The method of tanning leather, which consists in subjecting the hide to the action of a bath containing carbonate of iron.

2. The process of tanning or finishing hides for the production of leather, which consists in first liming and unhairing the hides, then subjecting them to a bath or solution containing carbonate of iron, next subjecting them to a solution of copperas and common salt dissolved in water, and finally treating them with cotton-seed oil or other oil or fatty substance capable of readily entering the pores of the leather.

3. In a tanning and finishing process, the steps which consist in first liming and unhairing the hides in any usual or convenient manner; second, subjecting the hides to a bath of water containing carbonate of iron in solution; and, third, removing the hides from the carbonate solution and subjecting them to the action of a bath of copperas and common salt dissolved in water, substantially as set forth.

4. The herein-described process of tanning and finishing hides, consisting in first liming and unhairing the hides in any usual or convenient manner; second, subjecting the hides to a bath of water containing carbonate of iron in solution; third, removing them from the carbonate solution and subjecting them to the action of a bath of copperas and common salt dissolved in water; fourth, bringing them under the action of the atmosphere, whereby the ferrous oxide contained in the pores of the hide is changed to a ferric oxide; and, fifth, treating the leather thus formed with cotton-seed oil or other fatty substance, substantially as and for the purpose set forth.

JOHN W. FRIES.

Witnesses:
 A. F. PFOHL,
 C. T. PFOHL.